(12) United States Patent
Traub et al.

(10) Patent No.: US 8,537,859 B2
(45) Date of Patent: Sep. 17, 2013

(54) REASSEMBLY OF MINI-PACKETS IN A BUFFER

(75) Inventors: Steven Traub, Rocklin, CA (US); Michael L. Ziegler, Roseville, CA (US); Jonathan E. Greenlaw, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 813 days.

(21) Appl. No.: 12/714,215

(22) Filed: Feb. 26, 2010

(65) Prior Publication Data

US 2011/0211591 A1 Sep. 1, 2011

(51) Int. Cl.
*H04J 3/24* (2006.01)
*H04W 28/06* (2009.01)

(52) U.S. Cl.
CPC .................................... *H04W 28/06* (2013.01)
USPC ........................................................ 370/473

(58) Field of Classification Search
CPC .................................................... H04W 28/06
USPC ...................................................... 370/473
See application file for complete search history.

(56) References Cited

U.S. PATENT DOCUMENTS

| | | | | |
|---|---|---|---|---|
| 5,169,497 A | * | 12/1992 | Sarkar et al. | 162/158 |
| 5,396,490 A | * | 3/1995 | White et al. | 370/474 |
| 5,461,614 A | * | 10/1995 | Lindholm | 370/394 |
| 5,548,587 A | * | 8/1996 | Bailey et al. | 370/395.7 |
| 6,185,208 B1 | * | 2/2001 | Liao | 370/392 |
| 6,795,866 B1 | * | 9/2004 | Mankude et al. | 709/238 |
| 7,065,086 B2 | * | 6/2006 | Basso et al. | 370/394 |
| 7,760,737 B2 | * | 7/2010 | Rana et al. | 370/394 |
| 2003/0076810 A1 | * | 4/2003 | Rezaiifar et al. | 370/349 |
| 2004/0004964 A1 | * | 1/2004 | Lakshmanamurthy et al. | 370/394 |
| 2009/0316698 A1 | * | 12/2009 | Menten | 370/392 |

OTHER PUBLICATIONS 9.4. How to reassemble split packets, 6 p. published Jan. 18, 2010 [Online] http://www.wireshark.org/docs/wsdg_html_chunked/ChDissectReassemble.html.

* cited by examiner

*Primary Examiner* — Ricky Ngo
*Assistant Examiner* — Phuongchau B Nguyen

(57) ABSTRACT

A system comprises a processor, a reassembly buffer that receives mini-packets, and at least one data structure that comprises bits. The bits indicate the presence or absence of each of the mini-packets in the reassembly buffer and further indicate whether one of the mini-packets is a final mini-packet in a series of the mini-packets. The processor uses the bits to determine whether all mini-packets forming the series are present in the reassembly buffer. As a result of the determination, the processor causes the series to be read from the reassembly buffer.

20 Claims, 8 Drawing Sheets

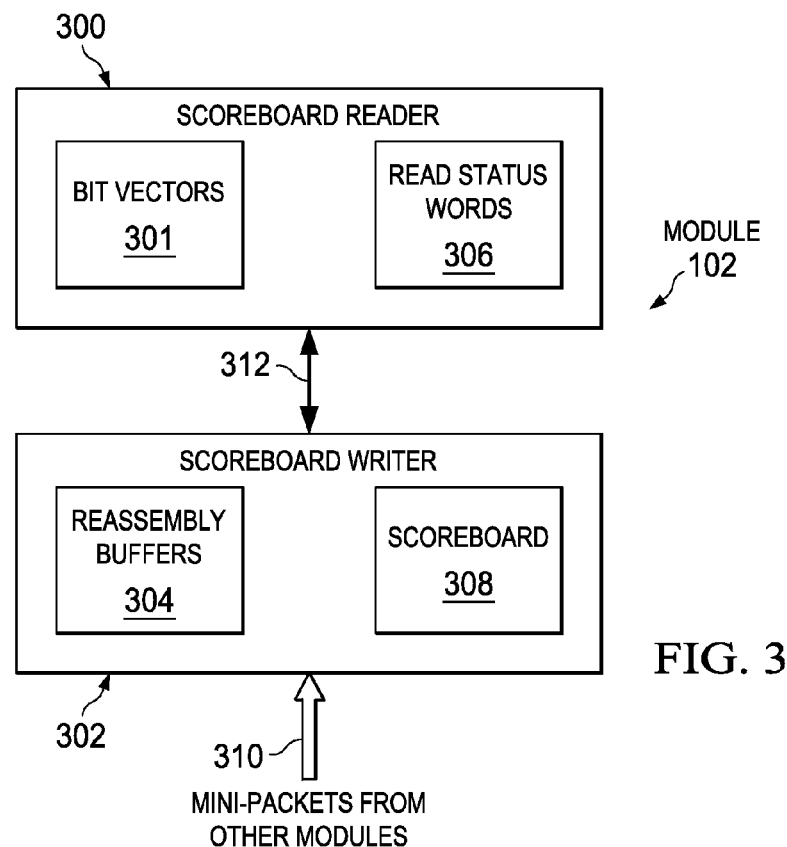
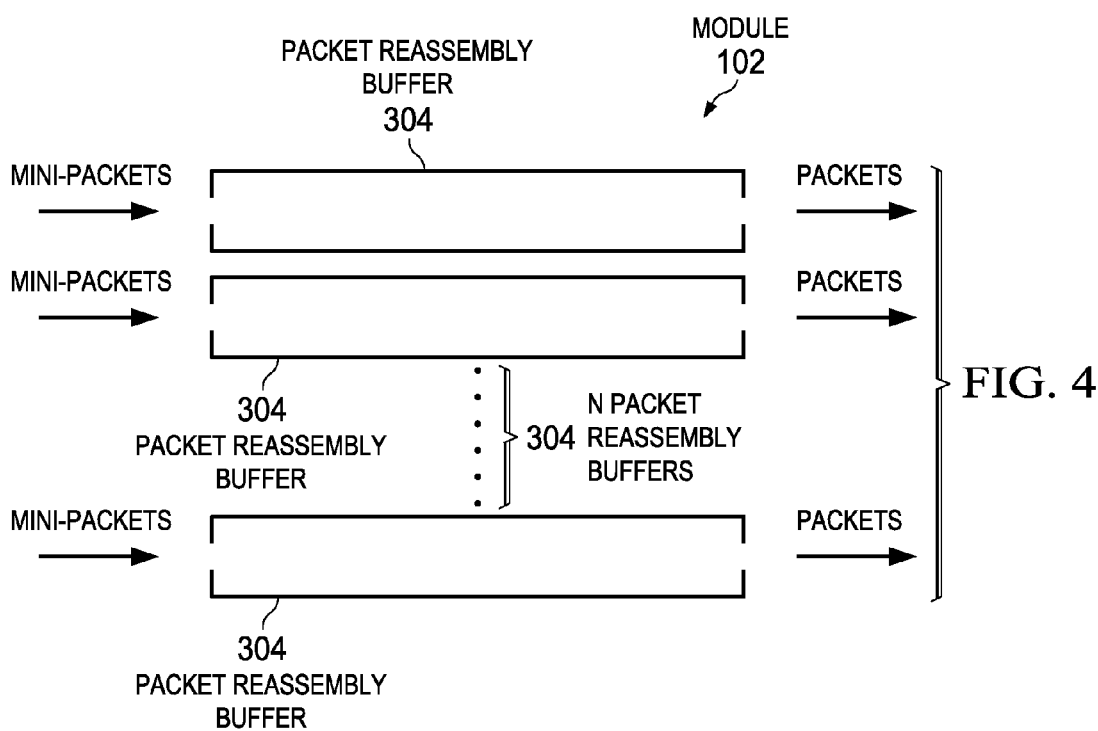

US 8,537,859 B2

REASSEMBLY OF MINI-PACKETS IN A BUFFER

BACKGROUND

Data packets often are disassembled into discrete mini-packets prior to transmission over a network. Once the mini-packets reach their destination, they must be reassembled to form the original packet. The destination's speed in reassembling the mini-packets is negatively impacted by algorithmic inefficiencies and by the failure of some mini-packets to arrive at the destination.

BRIEF DESCRIPTION OF THE DRAWINGS

For a detailed description of exemplary embodiments, reference will now be made to the accompanying drawings in which:

FIG. 3 illustrates the module of FIG. 2 in accordance with embodiments;

FIG. 4 illustrates a plurality of reassembly buffers within the module of FIGS. 2-3 in accordance with embodiments;

NOTATION AND NOMENCLATURE

Figure 1:
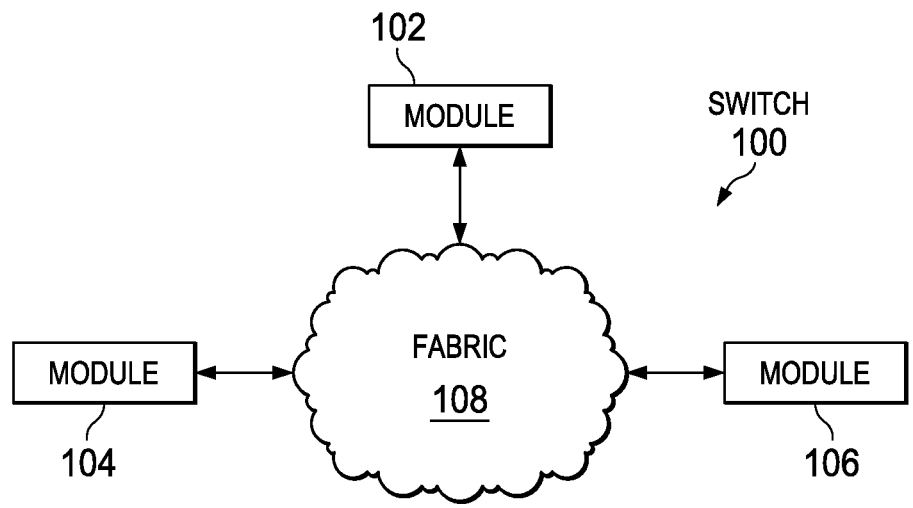
FIG. 1 shows an illustrative switch implementing the techniques disclosed herein in accordance with embodiments.

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection. Generally, a "mini-packet" comprises any unit of information which, when grouped with other mini-packets, forms a packet of information and which facilitates the transfer of the packet over a communication medium (e.g., a network).

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Disclosed herein is a technique for re-assembling packets that have been disassembled for transmission over a network. The technique generally comprises disassembling a packet into mini-packets for transmission over a network. Upon arrival at a destination, the mini-packets are reassembled within a reassembly buffer. As each mini-packet arrives, the destination updates a bit in a data structure, sometimes referred to herein as a "scoreboard," to indicate such arrival. One of the mini-packets is marked as the "final" mini-packet of the packet prior to transmission over the network. Thus, upon arrival of the final mini-packet, the destination updates a bit in the scoreboard data structure to indicate that the final mini-packet has arrived. The destination also maintains another data structure, sometimes called a "Read Status Word (RSW)," that comprises pointers to specific mini-packets within the reassembly buffer. Because the reassembly buffer contains a substantial number of mini-packets, the RSW data structure pointers indicate which mini-packets are the next mini-packets to be read out from the reassembly buffer. The destination further maintains a third data structure that indicates which of a plurality of reassembly buffers contain(s) a fully assembled packet that is ready to be read from that reassembly buffer. As described in detail below, these data structures are used together to quickly and efficiently reassemble data packets and read them out of their respective reassembly buffers.

Also described are techniques for identifying and discarding packets that have been damaged during transmission over the network. Embodiments of such techniques are made possible at least in part by the realization that a first packet that has failed to be fully reassembled within a predetermined amount of time after becoming next in line to be read out from the buffer is likely damaged and should be discarded. These embodiments also are made possible at least in part by the realization that a second packet (and any other packets) that are not fully reassembled and that have been in a state of reassembly at least since the first packet arrived at the front of the buffer also are likely damaged and should be discarded. Thus, in general, the technique comprises assigning a sequence identifier to each mini-packet as the mini-packet is disassembled for transmission over the network. As the name implies, the sequence identifiers are sequential, so that a mini-packet that is transmitted has an identifier that is one increment greater or lesser than that of the preceding packet. When the first packet arrives at the head of the buffer and is thus the next packet in line to be read out from the buffer, a timer is initialized and the mini-packet corresponding to the packet farthest away from the head of the buffer is identified and recorded. When the timer expires, any packets present from the head of the buffer to the recorded mini-packet that are not yet fully assembled are considered damaged and are discarded.

FIG. 1 shows an illustrative switch 100 within which the techniques disclosed herein may be implemented. In some embodiments, the switch 100 is disposed in a network whereby the switch 100 facilitates the transfer of packets between different entities coupled to the network. The switch 100 comprises multiple modules, such as modules 102, 104 and 106. The modules 102, 104 and 106 communicate with each other by way of a fabric 108. Modules 102, 104 and 106 facilitate data input to and output from the switch 100. The fabric 108 ensures that data received from a particular module is routed to the appropriate destination module. While the embodiments herein are described in the context of the switch 100, the embodiments may be extended for application to any networking context in which packets are disassembled for transmission over a network.

Figure 2:
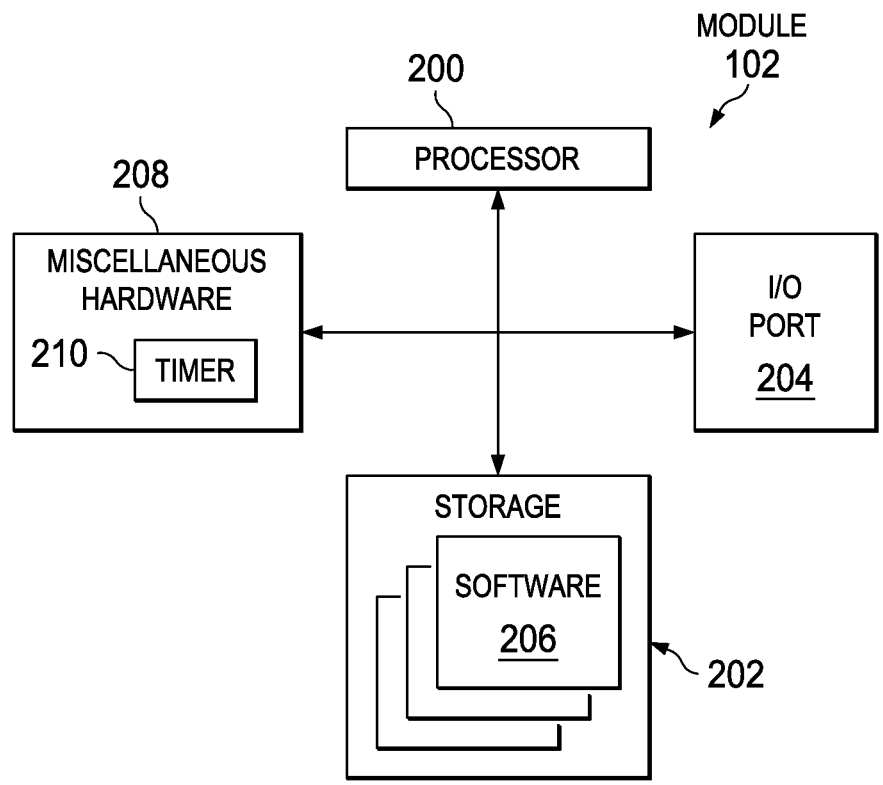
FIG. 2 shows an illustrative module that is housed within the switch of FIG. 1 and that implements the techniques disclosed herein in accordance with embodiments.

FIG. 2 shows a detailed view of the contents of illustrative module 102. The contents of modules 104 and 106 are similar to those of module 102. Module 102 comprises, inter alia, a processor 200, storage 202, an input/output (I/O) port 204 and miscellaneous hardware logic 208 that comprises a timer 210. The storage 202 may comprise any suitable type of volatile or non-volatile memory, such as random access memory (RAM), static RAM (SRAM), etc. The storage 202 also comprises software 206. Executing the software 206 enables the processor 200 to perform the various techniques disclosed herein. Generally, when the module 102 is described herein as performing a particular action, the processor 200 is performing that action as a result of executing the software 206. In some embodiments, firmware (not explicitly shown) is used in conjunction with or in lieu of software 206. In some embodiments, the module 102's actions are performed completely or almost completely by hardware 208 (e.g., circuit logic). In such embodiments, the hardware 208 comprises any suitable hardware that is capable of performing the techniques described herein, including the steps illustrated in FIGS. 9a-9c and 10. Data (e.g., packets, mini-packets) are transferred between modules using the I/O port 204. The module 102 may comprise circuitry in addition to that shown in FIG. 2.

FIG. 3 illustrates the operation of module 102. The module 102 may be conceptually divided into Scoreboard reader (SR) 300 and Scoreboard writer (SW) 302. Each of these sections comprises various hardware and/or software of the module 102. The SR 300 comprises bit vectors 301 and read status words (RSW) 306. These bit vectors 301 are data structures, the uses of which are described below. The SW 302 comprises reassembly buffer 304 and scoreboard 308, each of which comprises a data structure and the uses of which also are described below. Although only one reassembly buffer 304 is shown, in some embodiments, the SW 302 includes a separate reassembly buffer for each module with which the module 102 communicates. In some embodiments, the SW 302 comprises a total of 64 reassembly buffers. Further, although the scoreboard 308 is illustrated as being exclusively associated with the SW 302, in some embodiments, the scoreboard 308 is associated with both the SW 302 and the SR 300. In some such embodiments, the SW 302 writes to the scoreboard 308 and the SR 300 reads from the scoreboard 308 to perform the operations described herein.

The reassembly buffer 304 is a first-in, first-out (FIFO) buffer in the sense that the earlier that mini-packets of a whole packet begin to be received in the buffer 304, the earlier that whole packet is considered either for output from the buffer 304 or for deletion. However, in many cases, a mini-packet "A" that is received prior to a mini-packet "B" may be output (or discarded) from the buffer after mini-packet "B" by virtue of the ordering of the packets to which these mini-packets belong.

Generally, in operation, the SW 302 receives mini-packets from other modules (e.g., modules 104 and 106), as indicated by arrow 310. As indicated by arrow 312, the SW 302 then interacts with the SR 300 to reassemble the mini-packets into whole packets and, in the process, to identify and discard damaged packets as appropriate. The reassembly buffer 304 stores mini-packets received by the SW 302 from other modules external to the module 102. As explained above, the mini-packets are reassembled within the reassembly buffers 304 to form the whole packets that were originally disassembled prior to transmission to the module 102. Further, generally, the scoreboard 308 comprises a plurality of bits that indicate which mini-packets are present in the reassembly buffer 304. The scoreboard 308 also comprises bits that indicate whether a particular mini-packet in the reassembly buffer 304 is the final mini-packet in the series of mini-packets that forms a single, whole packet. The SW 302 is able to identify the final mini-packet because the final mini-packet comprises an identifier that labels it as such. This identifier is provided to the final mini-packet by the module that transmits the final mini-packet to the module 102. In some embodiments, the scoreboard 308 also may comprise parity bits for error-correction purposes.

The RSW 306 also comprises a plurality of bits. These bits form a pointer that identifies which mini-packet in the reassembly buffer 304 is the first mini-packet of the next packet to be read from the reassembly buffer 304. Stated in another way, the pointer in the RSW 306 identifies the first m-packet of the whole packet that is at the head of the reassembly buffer 304. The RSW 306 may comprise additional bits are described below.

The bit vectors 301 in the SR 300 generally comprise three 64-bit vectors. One of these 64-bit vectors 301 is a "Check" vector. Each of the 64 bits in the Check vector corresponds to a different reassembly buffer 304 and indicates whether that reassembly buffer 304 has recently been updated by the SW 302 (e.g., as a result of receiving a new mini-packet) and needs to be evaluated for the presence of a complete packet. Another one of these 64-bit vectors 301 is a "Read" vector. Each of the 64 bits in the Read vector corresponds to a different reassembly buffer 304 and indicates whether that reassembly buffer 304 contains a reassembled packet that is ready to be read out from that buffer 304. The third 64-bit vector 302 is a "Priority" vector. Each of the 64 bits in the Priority vector corresponds to a different reassembly buffer 304 and indicates whether the output of a reassembled packet in that buffer 304 deserves to be expedited. Stated in another way, because the processor 200's reading capabilities are limited in comparison to the total number of reassembly buffers that may need to be read, this Priority vector is used to arbitrate processor availability between multiple reassembly buffers 304.

Brief reference is now made to FIGS. 4-8 to explain the contents of the reassembly buffers 304, scoreboard 308, RSW 306, and bit vectors 301. Overall operation of the module 102 is then described in detail.

FIG. 4 illustrates the reassembly buffers 304. As previously explained, in at least some embodiments, the module 102 comprises 64 reassembly buffers 304, but the scope of this disclosure is not limited to any particular number of reassembly buffers. As shown, each reassembly buffer 304 receives mini-packets, reassembles the mini-packets into whole packets, and outputs whole packets. Packets that are not timely reassembled are discarded. Although mini-packets are shown entering the reassembly buffers 304 in a serial manner, in some embodiments, mini-packets may enter the reassembly buffers 304 in a non-serial manner. For instance, an incomplete packet that is located at the head of a reassembly buffer 304 may continue to be reassembled by adding newly received mini-packets to that incomplete packet.

Figure 5:
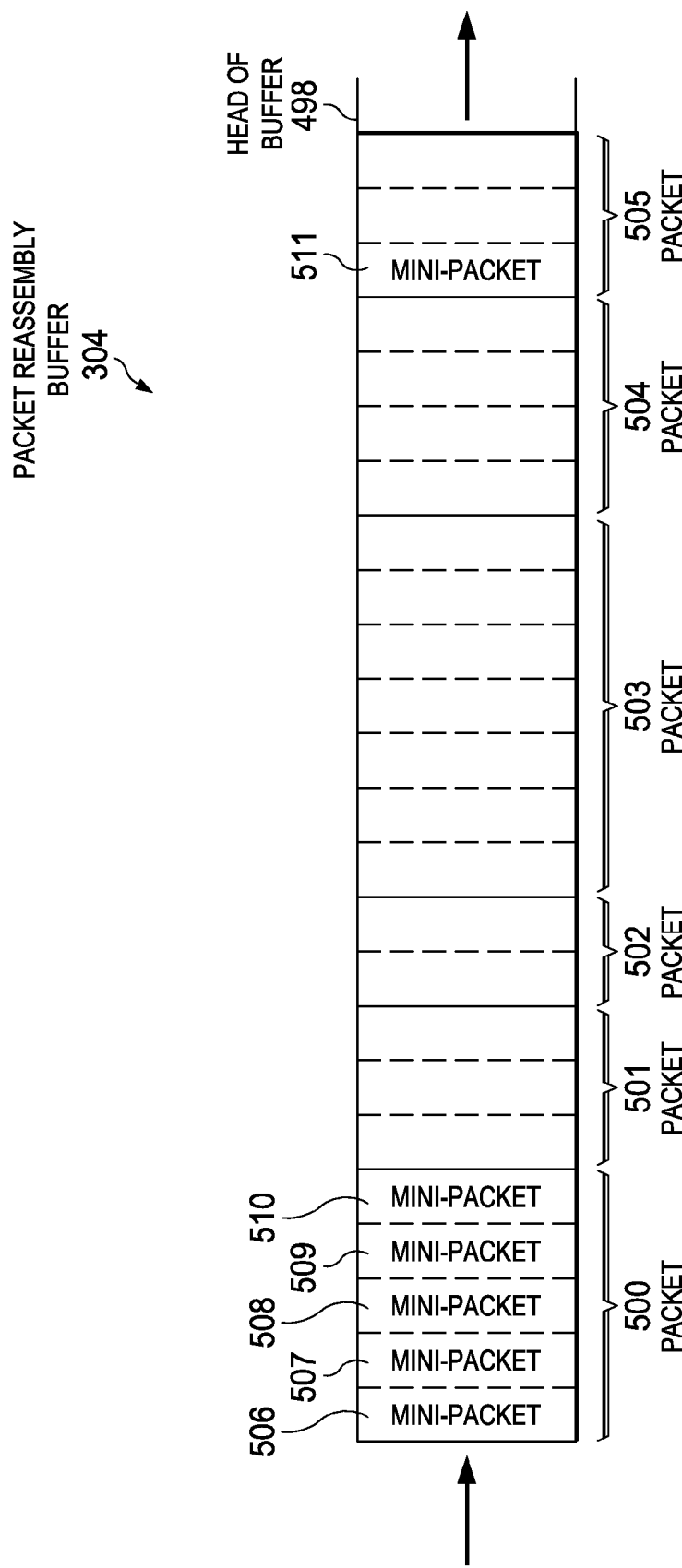
FIG. 5 illustrates a reassembly buffer of FIG. 4 in accordance with embodiments.

FIG. 5 shows a more detailed view of a single reassembly buffer 304. As shown, the reassembly buffer 304 comprises packets 500-505. Packet 505 is located at head 498 of the buffer 304. Of packets 500-505, packet 500 is located farthest away from the head 498. Each packet 500-505 comprises one or more mini-packets. For instance, as shown, the packet 500 comprises mini-packets 506-510. As explained above, a newly-arrived mini-packet may skip other packets in queue so that the newly-arrived mini-packet may be added to the packet with which it belongs. Thus, for example, if mini-packet 511 arrives in the reassembly buffer 304 after mini-packet 510 arrives in the reassembly buffer 304, the mini-packet 511 may "skip ahead" and be placed directly within the packet 505, as shown. In at least some embodiments, mini-packets are assigned to positions in the reassembly buffer 304 by virtue of an identifier assigned to the mini-packets prior to transmission over the fabric 108. Such identifiers are called "sequence identifiers." Sequence identifiers are assigned to outgoing mini-packets in a sequential manner. In a simplified example, the module 104 may transmit mini-packets to the module 102 and may label them sequentially as "1," "2," "3," etc. When the module 102 receives a mini-packet, the module 102 uses that mini-packet's sequence identifier to properly position the mini-packet in a sequential manner within the reassembly buffer 304. The end result, then, is that some mini-packets may "skip ahead" of other mini-packets that are already present in the buffer 304 by virtue of their sequence identifiers.

Figure 6:
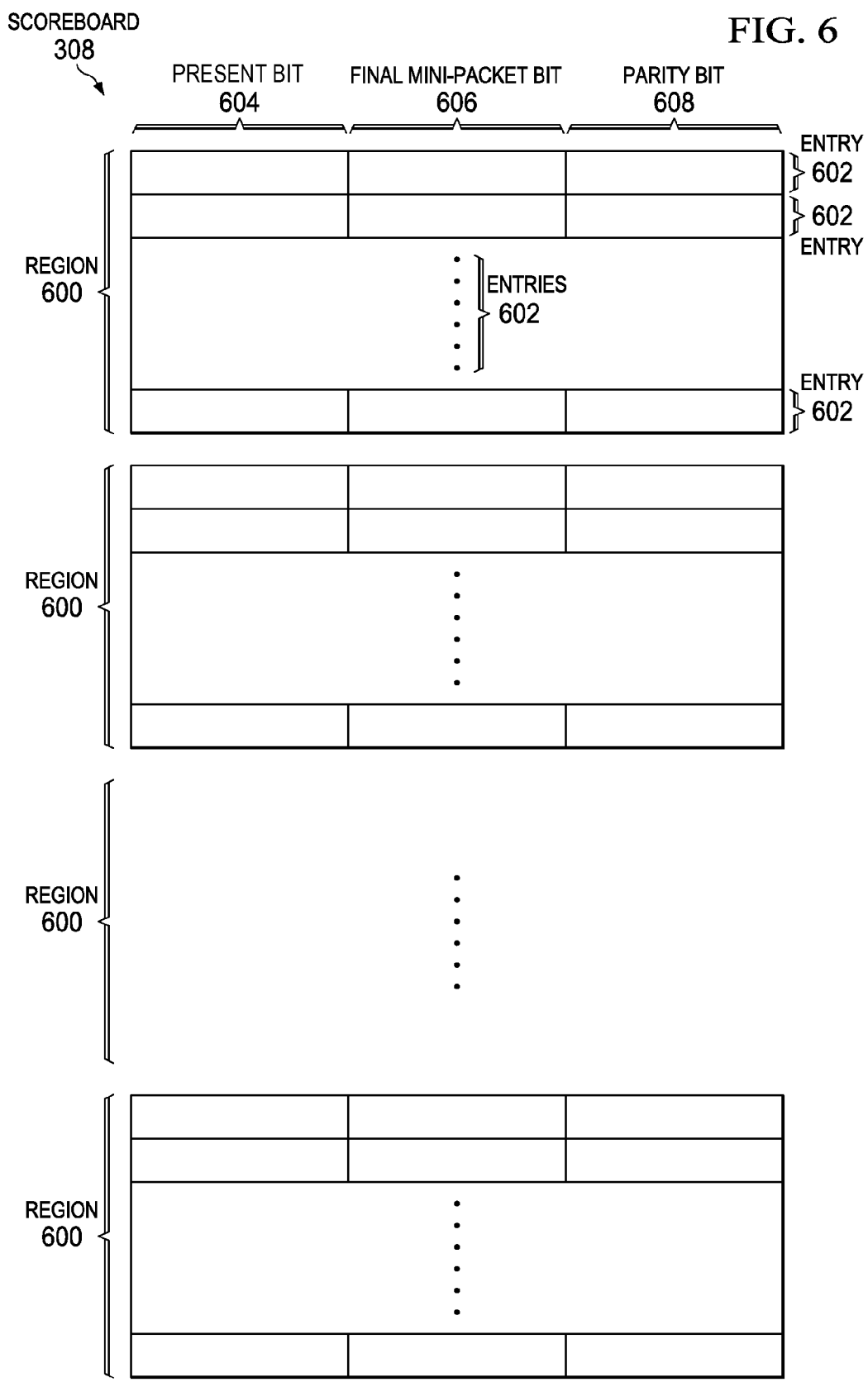
FIG. 6 illustrates a scoreboard data structure in accordance with embodiments.

FIG. 6 shows an illustrative scoreboard 308 in accordance with embodiments. The scoreboard 308 comprises 64 regions 600, and each region 600 is dedicated to a different reassembly buffer 304. Each scoreboard region 600 contains 256 entries 602, and each entry 602 is dedicated to a mini-packet that belongs to a packet that is present, in fully-assembled or partially-assembled form, in a reassembly buffer 304 corresponding to that region 600. The 256 entries 602 in a particular region 600 are partitioned into 8 groups of 32 entries, although these group partitions are not specifically shown.

Each entry contains 3 bits: a "present" bit 604, a "final mini-packet" bit 606, and a parity bit 608. The present bit 604 indicates whether a corresponding mini-packet is present in the associated reassembly buffer 304. In some embodiments, a bit sense is used in which a "1" bit value indicates the mini-packet's presence, while a "0" bit value indicates the mini-packet's absence. Other bit senses also may be used. The final mini-packet bit 606 indicates whether the corresponding mini-packet is the final mini-packet in a series of mini-packets that forms a whole packet. As previously explained, a final mini-packet may be labeled as such by the entity that transmits the mini-packet to the reassembly buffer 304. The parity bit 608 comprises the result of a logical XOR operation between bits 604 and 606 and may be used for parity checking purposes, as desired. The scope of this disclosure is not limited to a scoreboard that comprises only the types of information described herein.

Figure 7:
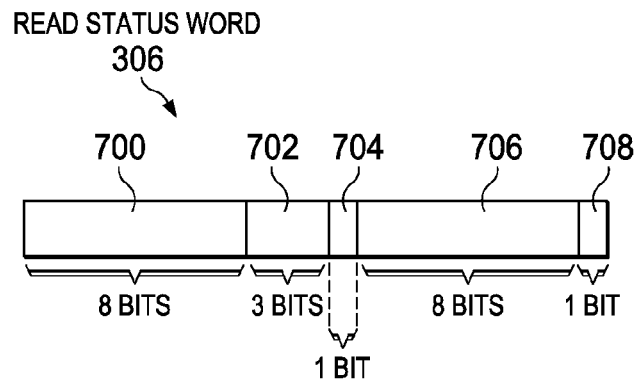
FIG. 7 illustrates a Read Status Word in accordance with embodiments.

FIG. 7 shows an illustrative RSW 306 in accordance with embodiments. The RSW 306 comprises five fields, although the scope of this disclosure is not limited as such. Specifically, in some embodiments, the RSW 306 comprises an 8-bit read pointer 700, a 3-bit Current Group ID 702, a present sense bit 704, an 8-bit end pointer 706, and a cleanup field bit 708. The read pointer 700 identifies the first mini-packet of the next packet to be read from the corresponding reassembly buffer 304. Thus, for instance, referring momentarily to FIG. 5, the packet 505 is at the head 498 of the reassembly buffer 304 and is thus the next packet that is to be read from the buffer 304. In this example, the read pointer 700 would point to mini-packet 512, since the mini-packet 512 is the first mini-packet of the packet that is at the head 498 of the corresponding reassembly buffer 304.

Referring again to FIG. 7, the Current Group ID pointer 702 identifies which of the groups of scoreboard entries 602 mentioned above has recently been updated by the SW 302 and needs to be checked by the SR 300 for the presence of a fully reassembled packet that is ready to be read from the corresponding buffer 304. The present sense bit 704 indicates the sense of the present bit 604. Stated in another way, the present sense bit 704 indicates what a "1" value for present bit 604 means and what a "0" value for present bit 604 means. Each time the Current Group ID "wraps around" (i.e., increments from 000, 001, 010 . . . 111 and then back to 000 again), the Present sense bit 704 is inverted (i.e., from 0 to 1 or from 1 to 0) so that the Present bits 604 in the scoreboard 308 do not have to be reset each time data is read from the reassembly buffer 304. The end pointer 706 identifies the final mini-packet that is expected to be read from the corresponding reassembly buffer 304 the next time that that reassembly buffer 304 undergoes a read operation. The cleanup field bit 708 is used in conjunction with the output or deletion of packets from the reassembly buffer 304 as described above. Specifically, when this bit 708 is set, the end pointer 706 is identified as the point in the reassembly buffer 304 up to which packets are to be either read from the buffer 304 or discarded from the buffer 304 (e.g., upon expiration of a timer). Uses of these fields, according to various embodiments, are described below.

Figure 8:
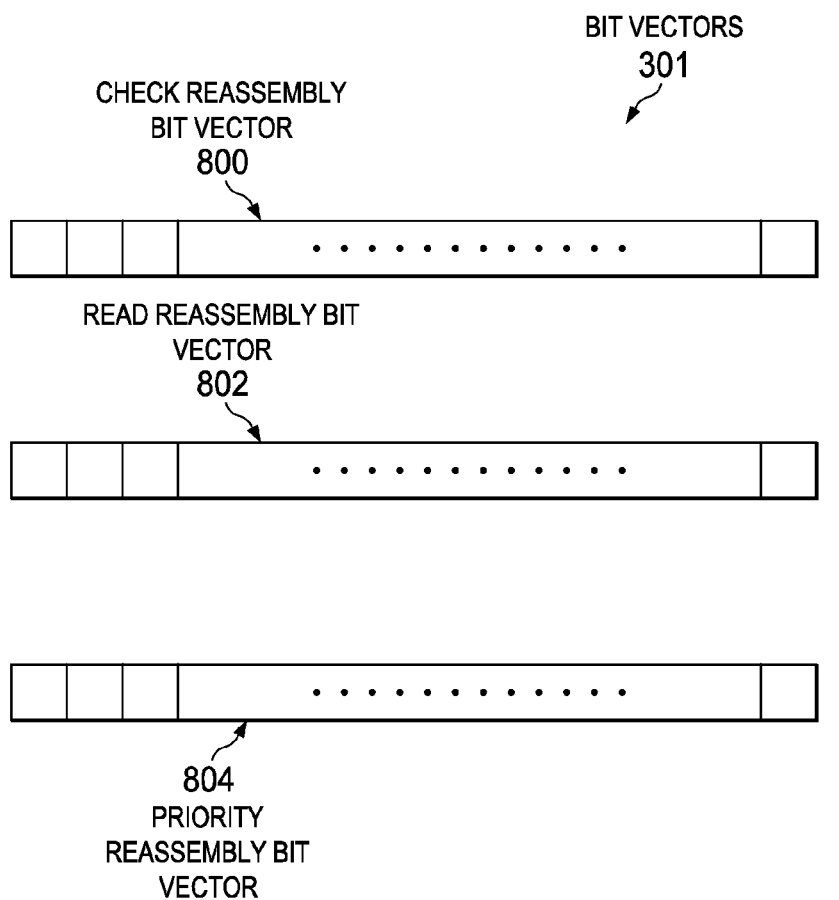
FIG. 8 illustrates multiple bit vectors in accordance with embodiments.

FIG. 8 shows the bit vectors 301 of FIG. 3. In some embodiments, the bit vectors 301 generally include a Check vector 800, a Read vector 802 and a Priority vector 804. In at least some embodiments, each of these vectors comprises 64 bits. In some embodiments, each bit in the Check vector 800 corresponds to a different reassembly buffer 304 and indicates whether that reassembly buffer 304 has been updated and needs to be examined for the presence of a fully assembled packet. In some embodiments, each bit in the Read vector 800 corresponds to a different reassembly buffer 304 and indicates whether that reassembly buffer 304 contains a fully assembled packet that is ready to be read out from the buffer. In some embodiments, each bit in the Priority vector 804 corresponds to a different reassembly buffer 304 and indicates whether that reassembly buffer has priority over other reassembly buffers when determining from which reassembly buffer a packet should be read first. Operation of the module 102 is now described.

In operation, the modules 104 and 106 transmit mini-packets to the module 102. Other modules also may transmit mini-packets to the module 102. Prior to transmitting each mini-packet, the module 104 or 106 labels that mini-packet with a sequence identifier. As explained above, sequence identifiers are assigned to outgoing mini-packets in a sequential manner. In a simplified example, the module 104 may transmit mini-packets to the module 102 and may label them sequentially as "1," "2," "3," etc. The module 104 may also add additional data to each outgoing mini-packet that identifies the mini-packet as having been sent by module 104. The final mini-packet of a whole packet is labeled as the final mini-packet. Other information may be included as desired.

The module 102, upon receiving a mini-packet, analyzes the mini-packet's identifying information to determine which module sent the mini-packet. The module 102 performs this analysis so that the mini-packet may be placed in the appropriate reassembly buffer 304, since all mini-packets from a particular module are placed in a common reassembly buffer. Once the module 102 has determined to which reassembly buffer 304 a particular mini-packet belongs, the module 102 examines the mini-packet's sequence identifier to determine where in the buffer 304 the mini-packet should be placed.

For instance, module 104 may transmit two packets to the module 102. The two packets may comprise ten mini-packets each, for a total transmission of 20 mini-packets from the module 104 to the module 102. Prior to transmission, the module 104 labels the 20 mini-packets with sequence identifiers. The mini-packets are labeled in the order that they are transmitted (e.g., from "1" to "20"). Thus, mini-packets with sequence identifiers 1-10 comprise packet 1, while mini-packets with sequence identifiers 11-20 comprise packet 2. The module 104 also labels the final mini-packet in a packet as the last mini-packet so that the module 102 is able to determine where a packet begins and ends. In the present case, mini-packets 10 and 20 are labeled as "final" mini-packets.

Although the mini-packets are transmitted sequentially, the module 102 may receive the mini-packets out of order due to various transmission factors (e.g., different routes taken to reach the module 102). Thus, for example, while the module 104 may transmit the mini-packets in the following order:

1, 2, 3, 4, 5, 6, 7, 8, 9, 10, 11, 12, 13, 14, 15, 16, 17, 18, 19, 20, the module 102 actually may receive the mini-packets in the following order:

16, 4, 5, 2, 3, 6, 8, 7, 10, 9, 12, 13, 14, 11, 15, 1, 17, 19, 18, 20.

The module 102 recognizes that each of these mini-packets has been transmitted by the module 104 because of the identifying information included therewith. As a result, the module 102 groups all of these mini-packets in the same reassembly buffer 304. However, because these mini-packets are received out of order, the module 102 may insert mini-packets into the reassembly buffer 304 regardless of the order in which they were received. Thus, although mini-packet 4 is received prior to mini-packet 2, the module 102 recognizes that mini-packet 2 should be ahead of mini-packet 4. As a result, the module 102 permits mini-packet 2 to "skip over" mini-packet 4 so that the mini-packet 2 may take its rightful place ahead of all other mini-packets except for mini-packet 1.

The foregoing processes may be performed by the SW 302 of the module 102. Upon inserting a mini-packet into its reassembly buffer 304, the SW 302 transmits a signal to the SR 300. This signal indicates to the SR 300 that the SW 302 has written a new mini-packet to a reassembly buffer 304. This signal also indicates to the SR 300 precisely to which reassembly buffer 304 the new mini-packet has been written. The signal may identify the reassembly buffer using, for instance, a multi-bit identifier.

In response to receiving this signal, the SR 300 sets (or, in some embodiments, clears) the bit in the Check vector 800 that corresponds to the reassembly buffer identified in the signal. This set bit indicates that the reassembly buffer 304 to which it corresponds has received a new mini-packet and may now contain a fully assembled packet that should be read out from the reassembly buffer 304. This process—of the SW 302 receiving a mini-packet, forwarding it to the proper reassembly buffer 304, and notifying the SR 300, and the SR 300 responding by adjusting the Check vector 800—progresses alongside the monitoring process that is now described.

The SR 300 performs a monitoring process to watch for reassembly buffers that may contain fully assembled packets that are ready to be read. Specifically, the SR 300 repeatedly cycles through the Check vector 800 to determine which reassembly buffer(s) 304 has recently been updated and may contain a completely assembled packet that is ready to be read out from the buffer. Upon encountering an asserted bit in the Check vector 800, the SR 300 locates the corresponding RSW 306 for that reassembly buffer 304 and reads the Current Group ID 702 of the RSW 306 to determine which group of scoreboard entries requires evaluation. The SR 300 also reads the Read pointer 700 to determine precisely where in the group identified by Current Group ID 702 the SR 300 should begin checking entries if the Read pointer 700 falls within the current group. The SR 300 then begins checking entries at that location, ensuring that each entry checked indicates that the corresponding mini-packet is present in the associated reassembly buffer 304. The SR 300 also determines whether a mini-packet that is present in the group currently being checked is marked as "final." If all mini-packets in the current group are present but none is marked "final," the packet is so large that it spans multiple groups. In that case, the SR 300 may continue by checking the next group for the presence of a "final" mini-packet. If a "final" mini-packet is found and all preceding mini-packets (up to and including the mini-packet marked as "final") are present, the SR 300 sets the corresponding bit in the Read vector 802. The SR 300 also writes the end pointer 706 to indicate the entry corresponding to the final mini-packet of the packet. Further, if the processor 200 has the capability to read from a reassembly buffer 304 (i.e., if the processor is not too busy with other tasks), the SR 300 causes the processor 200 to read the complete packet from the reassembly buffer 304 (e.g., by sending a signal that includes the read pointer 700 and/or any other appropriate information).

Alternatively, during the monitoring process, if the SR 300 locates a mini-packet marked as "final" and all preceding mini-packet entries in the same group (up to and including the mini-packet entry that is marked as "final") indicate that mini-packets are present, the SR 300 sets the corresponding bit in the Read vector 802. The SR 300 also writes the End pointer 706 to indicate the entry corresponding to the final mini-packet of the packet. Further, if the processor 200 has the capability to read from a reassembly buffer 304 (i.e., if the processor is not too busy with other tasks), the SR 300 causes the processor 200 to read the complete packet from the reassembly buffer 304 (e.g., by sending a signal that includes the read pointer 700 and/or any other appropriate information).

Alternatively, if a mini-packet is not present and/or no final mini-packet has been received, no action is taken and the SR 300 resumes cycling through the bits of the Check vector 800.

In the foregoing cases, a packet may be ready to be read from the reassembly buffer in which it is located, but the processor 200 may be unavailable to read the packet from the assembly buffer 304. Such cases may be the norm and not the exception. To handle such cases, an arbitration process may be implemented. During the arbitration process, the SR 300 cycles through the Read vector 802 in search of asserted bits, which indicate that the corresponding reassembly buffer 304 contains a packet that is ready to be read. When the SR 300 encounters such an asserted bit, it clears the bit and uses the corresponding RSW 306 to find and read the packet that is in the corresponding reassembly buffer 304. Specifically, the SR 300 begins reading at the mini-packet that corresponds to the Read pointer 700 and finishes reading at the mini-packet that corresponds to the End pointer 706. The entire packet is thus read out from the reassembly buffer 304 and routed to the appropriate destination for further processing.

In some embodiments, when a Priority vector 804 bit is set, a read operation may be extended past the End pointer 706 to the group that follows the current group (i.e., the Control Group ID 702 incremented by one). In this way, additional data may be read during a single read operation. Such an extension of a read operation also may be made in cases where the Priority vector 804 is not set (e.g., if the amount of data to be read from the current group does not meet a predetermined threshold). In addition, when the Priority vector

804 is set, the overall amount of data read can be increased by checking the corresponding reassembly buffer 304 more frequently. In such embodiments, the overall amount of data is increased not by increasing the amount of data accessed per read operation but, instead, by increasing the frequency of read operations. In some embodiments, a set Priority vector 804 bit may cause both an increase in frequency of read operations and an increase in the amount of data accessed per read operation.

As explained above, the reassembly buffers 304 are used to assemble mini-packets into whole packets. There are instances, however, in which reassembly of a whole packet is not possible. For instance, in some cases, mini-packets may be lost in transit to the module 102. As a result, in some embodiments, packets that are not fully reassembled within a predetermined period of time are discarded. As previously mentioned, each mini-packet is assigned a sequence identifier prior to transmission to the module 102. As each mini-packet from a particular source module (e.g., module 104 or, alternatively, module 106) arrives at the module 102, the SW 302 reads the sequence identifier of that mini-packet and compares it to a sequence identifier stored in storage 202 (e.g., in a register). The stored sequence identifier represents the mini-packet that is farthest from the head of the assembly buffer 304 (e.g., the mini-packet with the greatest sequence identifier value). If, upon such a comparison, the SW 302 determines that the sequence identifier of the newly-received mini-packet is greater than the stored sequence identifier, the sequence identifier of the newly-received mini-packet replaces the stored sequence identifier. Otherwise, no such replacement is made. In this way, the storage 202 always contains the sequence identifier of the mini-packet that is farthest away from the head of the buffer 304. Referring to FIG. 5, in the example shown, the packet 505 is at the head 498 of the buffer 304 and, thus, the mini-packet that is farthest away from the head of the buffer 304 is mini-packet 506. Thus, in this example, the storage 202 would contain the sequence identifier of mini-packet 506.

Each time a new packet (more particularly, a mini-packet of a new packet), such as packet 505 of FIG. 5, arrives at the head 498 of buffer 304, the SW 302 initiates a timer (e.g., using a software application 206, a hardware timer 210, or by some other suitable means). The timer may be adjusted to any desired period of time. At the same time that the timer is initiated, the SW reads the storage 202 to determine the sequence identifier of the mini-packet that is farthest away from the head 498 of the buffer 304. This read value is hereinafter referred to as the "read sequence identifier." If the packet 505 is not fully assembled before the timer expires, then the packet 505 is discarded; otherwise, it is read out from the buffer 304. Upon timer expiration, all packets following packet 505—up to and including the mini-packet corresponding to the read sequence identifier—also are evaluated for completeness. Any packet that is not fully assembled is discarded, while any packet that is fully assembled is permitted to remain in the buffer 304 for subsequent reading. In some embodiments, any packet that began the reassembly process in the buffer 304 as of the start of the timer is fully reassembled before the timer expires. To this end, the read sequence identifier helps identify the last packet to begin reassembly as of the time the timer is initialized. Thus, this packet and any packets received prior to this packet are fully reassembled before the timer expires. If any of these packets are not reassembled by the timer's expiration, that packet may be discarded. In some cases, a particularly egregious communication error may occur such that several packets are damaged during transmission. To ensure that such cases are adequately addressed, in some embodiments, a second timeout interval is initiated immediately after the first timeout interval is complete. Initializing the timer a second time immediately after packets are discarded in the first interval ensures that all or nearly all defective packets associated with that communication error are identified and discarded. In some embodiments, additional timeout intervals may be performed.

For instance, referring to FIG. 5, the timer may be initialized when packet 505 reaches the head 498 of the buffer 304. At that time, the mini-packet that is farthest away from the head of the buffer 304 is mini-packet 506. Thus, the sequence identifier of mini-packet 506 is the read sequence identifier. The packet 500 containing mini-packet 506, as well as all packets that began reassembly prior to packet 500 (i.e., packets 501-505), finish reassembly prior to the timer's expiration. Any packet 500-505 that does not finish reassembly prior to the timer's expiration may be discarded from the buffer 304.

Figure 9A:
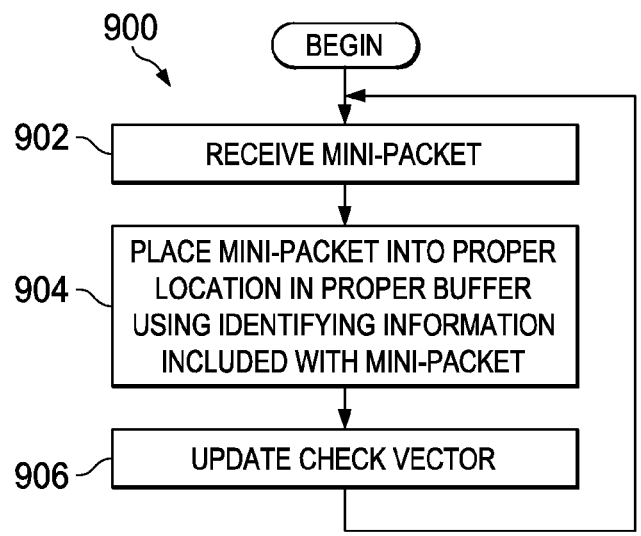
FIGS. 9a-9c and 10 show flow diagrams of illustrative methods that are in accordance with embodiments.
Figure 9C:
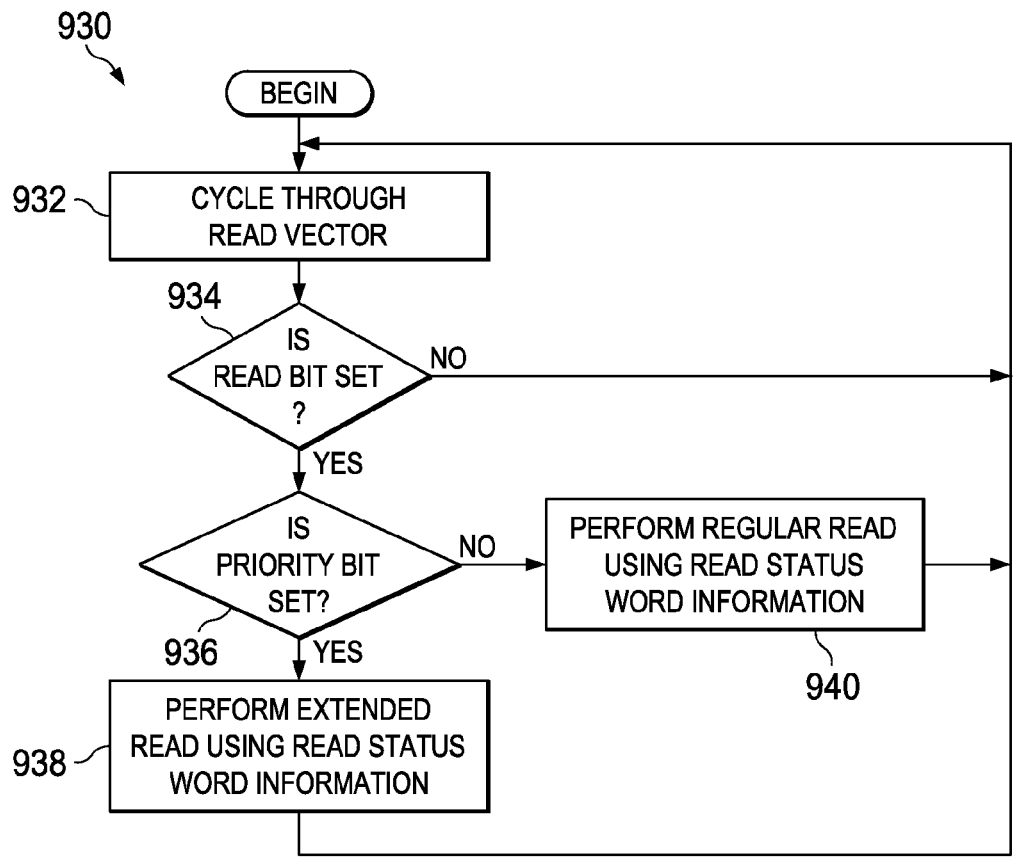
Figure 9B:
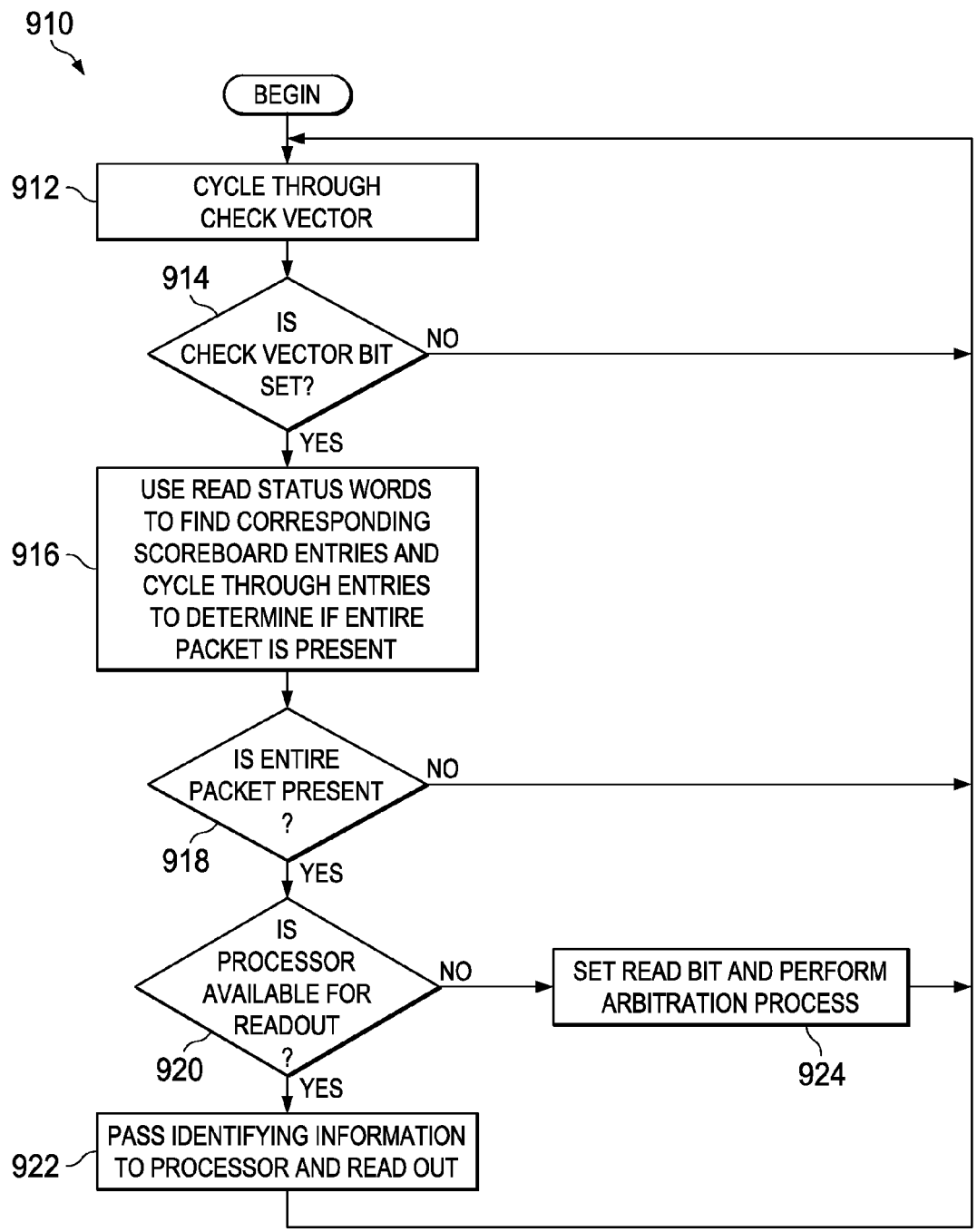
Figure 10:
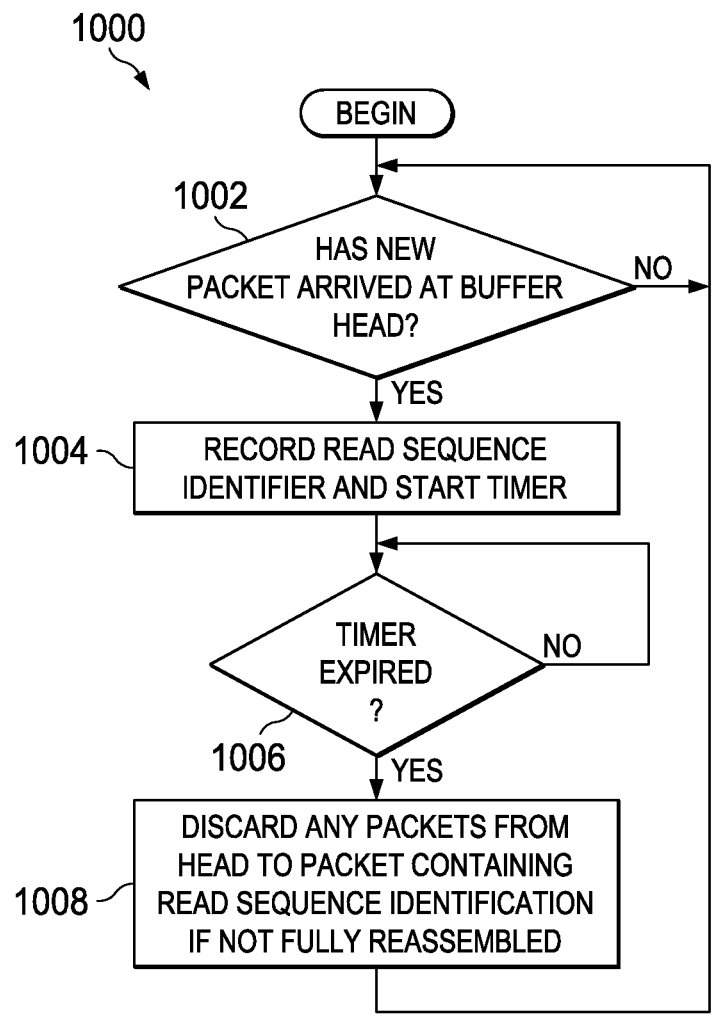

FIGS. 9a-9c and 10 show flow diagrams of illustrative methods that are in accordance with embodiments. More specifically, FIGS. 9a-9c generally describe the processes that are used to reassemble packets and to read fully reassembled packets out of their reassembly buffers. FIG. 10 generally describes the process used to identify and discard damaged packets.

Referring to FIG. 9a, a method 900 begins by receiving a mini-packet (block 902). The method 900 also comprises placing the mini-packet in the proper location in the proper reassembly buffer (block 904). The mini-packet is so placed using identifying information with which it is labeled (block 904). The method 900 further comprises updating the Check vector once the mini-packet has been appropriately placed into its reassembly buffer (block 906).

Referring to FIG. 9b, a method 910 comprises cycling through the Check vector to identify reassembly buffers that have recently been updated with one or more new mini-packets and that may contain a fully reassembled packet that is ready to be read (block 912). If a Check vector bit is set (block 914), the method 910 comprises using the corresponding RSW to locate the corresponding scoreboard entries and cycling through the entries to determine if the entire packet is present, including the mini-packet marked as "final" (block 916). If a fully reassembled packet is not present (block 918), the method 910 resumes cycling through the Check vector (block 912). Otherwise, the method 910 comprises determining whether a processor is available for immediate readout (block 920). If so, information identifying the fully reassembled packet is passed to the processor for readout (block 922). Otherwise, the method 910 comprises setting the corresponding Read vector bit and performing the arbitration process described above (block 924).

Referring to FIG. 9c, a method 930 comprises cycling through the Read vector (block 932) to locate a set bit (block 934). If a Read vector bit is set (block 934), the method 930 comprises determining if the corresponding Priority bit also is set (block 936). If so, the method 930 comprises performing an extended read using RSW information, as explained above (block 938). Otherwise, the method 930 comprises performing a normal-length (i.e., non-extended) read using RSW information, as described above (block 940).

Referring to FIG. 10, a method 1000 comprises determining whether a new packet has arrived at the buffer head (block 1002). If so, the method 1000 comprises recording the read sequence identifier and initializing a timer (block 1004). The method 1000 further comprises determining whether the timer has expired (block 1006). If so, the method 1000 comprises discarding any not-fully-assembled packets from the buffer head to the packet containing the mini-packet that corresponds to the read sequence identifier (block 1008).

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A system, comprising:
   a processor;
   a reassembly buffer that receives mini-packets; and
   at least one data structure that comprises bits that correspond to:
      an entry for each mini-packet received in the reassembly buffer, each entry comprising a present bit having a value to indicate whether a corresponding mini-packet is present in the reassembly buffer and a final mini-packet bit to indicate whether the corresponding mini-packet is the final mini-packet in a series of mini-packets; and
      a present sense bit, wherein said present sense bit is to indicate a current meaning of the value of the present bit;
   wherein the processor is to use said bits to determine whether all of the mini-packets belonging to said series of mini-packets are present in the reassembly buffer; and
   wherein, as a result of said determination, the processor is to read said series of mini-packets from the reassembly buffer and invert the present sense bit.

2. The system of claim 1, wherein:
   in response to a mini-packet of a first packet reaching a head of the reassembly buffer, the processor is to initialize a timer and record an identifier, wherein said identifier identifies a mini-packet in the reassembly buffer that is farthest away from said head of the reassembly buffer; and
   upon expiration of the timer, the processor is to discard all of the mini-packets of said first packet in response to a determination that all of the mini-packets of the series of mini-packets are not enabled to be read from the reassembly buffer, and to discard a second packet that contains said mini-packet associated with the identifier if said second packet is not reassembled.

3. The system of claim 1, wherein, in response to a detection of a priority bit in said at least one data structure, the processor is to read additional mini-packets from the reassembly buffer in addition to said series.

4. The system of claim 1, wherein, to read said series from the reassembly buffer, the processor is to use said at least one data structure to determine a first mini-packet in the series.

5. The system of claim 1, wherein in response to a determination that all of the mini-packets in said series are present in the reassembly buffer and further indicates that none of said mini-packets in said series is a final mini-packet, the processor is to determine whether one among a plurality of additional mini-packets comprises a final mini-packet for said series.

6. The system of claim 5, wherein, in response to a determination that said one among the plurality of additional mini-packets comprises a final mini-packet for said series, the processor is to read said series from the reassembly buffer.

7. The system of claim 1, wherein the system comprises a network switch.

8. The system of claim 1, wherein, in response to a detection of a priority bit in said at least one data structure associated with one of a plurality of series mini-packets, the processor is to at least one of:
   increase a frequency of read operations; and
   clear the priority bit, and read the associated series of mini-packets from the reassembly buffer.

9. A method, comprising:
   receiving mini-packets into a reassembly buffer;
   updating, by a processor, bits in at least one data structure, wherein said at least one data structure comprises bits that correspond to:
      an entry for each mini-packet received in the reassembly buffer, each entry comprising a present bit having a value indicating whether a corresponding mini-packet is present in the reassembly buffer and a final mini-packet bit to indicate whether the corresponding mini-packet is the final mini-packet in the series of mini-packets;
      a present sense bit, wherein said present sense bit indicates a current meaning of the value of the present bit; and
   reassembling said series of mini-packets, wherein said reassembling includes analyzing said bits in the at least one data structure to determine whether all of the mini-packets belonging to said series of mini-packets have been received by the reassembly buffer to form a reassembled packet; and
   based upon said determination, reading, by said processor, said reassembled packet out of the reassembly buffer and inverting the present sense bit.

10. The method of claim 9, further comprising:
    initializing a timer in response to a mini-packet of a first packet reaching a head of the reassembly buffer;
    recording a read sequence identifier when initializing the timer, said read sequence identifier identifying a most recently received mini-packet in the reassembly buffer;
    upon expiration of the timer, determining whether said first packet has been reassembled and whether a second packet including said most recently received mini-packet has been assembled; and
    based upon said determination, discarding one or both of the first packet and the second packet.

11. The method of claim 10, wherein said determining includes determining whether said first packet has been fully reassembled and whether said second packet has been fully reassembled.

12. The method of claim 10, further comprising discarding a third packet that is located in the reassembly buffer between the first and second packets, wherein the third packet is not fully reassembled.

13. The method of claim 9, further comprising detecting a priority bit associated with said reassembly buffer and, as a result of said detection, reading additional mini-packets out of said buffer in addition to said reassembled packet.

14. The method of claim 9, wherein reading said packet comprises accessing a pointer that points to a first mini-packet of said packet.

15. The method of claim 9, wherein the bits further correspond to pointers to mini-packets within the reassembly buffer to indicate which mini-packets are the next mini-packets to be read out from the reassembly buffer.

16. A method, comprising:
    in response to an arrival of a first packet at a head of a reassembly buffer, initiating a timer and recording an identifier associated with a most recently arrived mini-packet in said reassembly buffer;

populating said first packet with mini-packets as the mini-packets arrive into the reassembly buffer;

updating a data structure to indicate arrival of said mini-packets into the assembly buffer, said updating including updating a present bit having a value indicating whether a corresponding mini-packet is present in the reassembly buffer and a final mini-packet bit to indicate whether the corresponding mini-packet is the final mini-packet in the series of mini-packets, said data structure including a present sense bit to indicate a current meaning of the value of the present bit;

determining, using said data structure, whether said first packet is assembled and whether another packet associated with said identifier is assembled; and in response to the determining that the first packet and said another packet are not assembled, discarding, by a processor, said first packet and said another packet associated with said identifier.

17. The method of claim 16, wherein recording an identifier associated with said mini-packet comprises recording an identifier associated with a mini-packet that is present in the reassembly buffer and that is farthest away from said head of the reassembly buffer.

18. The method of claim 16, wherein in response to determining that all of the mini-packets in said first packet are present in the reassembly buffer, determining that none of said mini-packets in said first packet is a final mini-packet and, further, in response to determining that one among a plurality of additional mini-packets comprises a final mini-packet, reading said first packet and said additional mini-packets from the reassembly buffer.

19. The method of claim 16, further comprising:
reading said first packet out of the reassembly buffer;
inverting the present sense bit; and
not updating the present bits among said bits that indicate whether mini-packets are present in the reassembly buffer corresponding to the first packet.

20. The method of claim 16, wherein:
determining whether said first packet is assembled further comprises determining whether all of the mini-packets belonging to said first packet are present in the reassembly buffer;
determining whether said another packet is assembled further comprises determining whether all of the mini-packets belonging to said another packet are present in the reassembly buffer; and
discarding said first packet and said another packet further comprises discarding said first packet and said another packet as a result of determining that said first packet is not fully reassembled and that said another packet is not fully reassembled.

* * * * *